Figure 1:
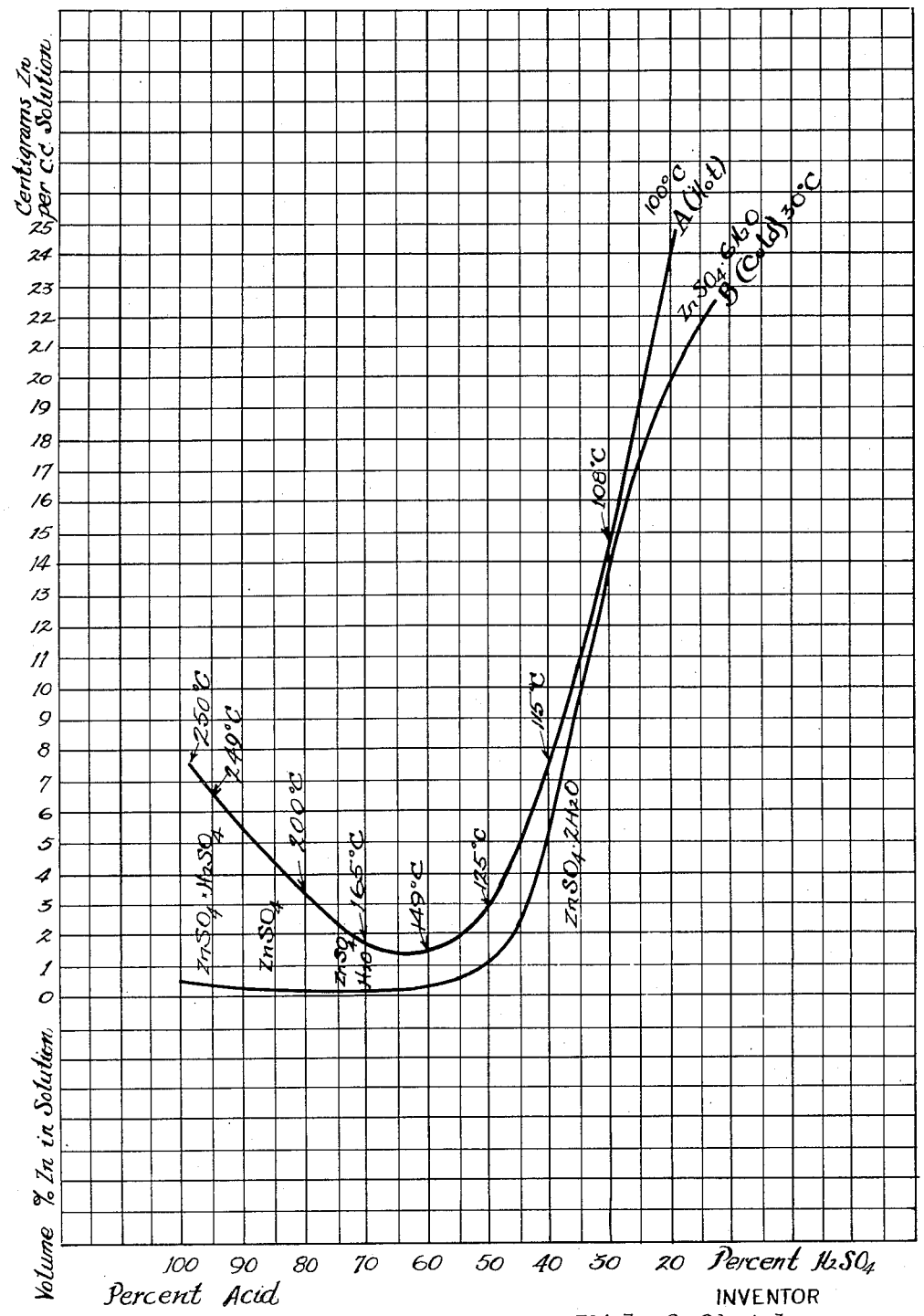

Dec. 5, 1933.  N. C. CHRISTENSEN  1,937,636
PROCESS OF TREATING LEAD-ZINC SULPHIDE ORES
Filed Oct. 12, 1931  2 Sheets-Sheet 1

INVENTOR
Niels C. Christensen
By
Attorneys

Patented Dec. 5, 1933

1,937,636

UNITED STATES PATENT OFFICE 1,937,636

PROCESS OF TREATING LEAD-ZINC SULPHIDE ORES

Niels C. Christensen, Salt Lake City, Utah

Application October 12, 1931. Serial No. 568,514

7 Claims. (Cl. 23—125)

This invention relates to a process for the treatment of complex or mixed lead-zinc sulphide ores. Objects of the process are to recover the zinc and lead therefrom in separate and distinct products, to recover sulphur combined with these metals as hydrogen sulphide, to recover residual sulphides such as pyrite, chalcopyrite, etc., with their gold and silver content, as a product substantially free from lead and zinc, and to recover the silver from the lead and zinc sulphide minerals either as a separate product or with the residual sulphide product. The importance of such a process of separation as applied to these complex ores will be apparent to metallurgists engaged in their treatment since the methods of treatment now in common use are relatively inefficient and lose a considerable proportion of the metals in these ores. For example treatment by differential flotation to separate the ore into lead sulphide, zinc sulphide and pyrite (or residual sulphide) concentrates results in some loss of all the sulphides in the tailings and a loss of each of these products with the others due to the relative imperfection of the separation. Further treatment of the separated products by smelting also involves some loss and considerable expense for roasting, smelting, refining, etc. It is an object of the invention to avoid such losses and to make a substantially complete separation of the ore as described by a rapid and relatively simple treatment.

The process of this invention consists of two main steps, the first for the separation of the zinc and the second for the separation of the lead (or lead and soluble silver) from the ore, leaving the residual sulphides for such further treatment as may be desired. The first step in the process consists in grinding the comminuted ore with an excess of hot relatively concentrated sulphuric acid to convert the lead and zinc sulphides to sulphates and separate the sulphur therefrom. This process is preferably carried out with sulphuric acid of such concentration that the sulphur is driven off as $H_2S$.

As noted in my U. S. Patent 1,434,084 hot concentrated sulphuric acid of concentrations above 50% $H_2SO_4$ attack the ZnS in these ores, acids of a concentration as low as 50% $H_2SO_4$ being considerably less active than those of higher concentration so that acids of a concentration of 60% $H_2SO_4$ or higher being necessary for efficient sulphating. As also noted in this patent, the action of the hot acid upon the sulphides varies with its concentration: Acids containing over 60% $H_2SO_4$ all attack zinc sulphide rapidly the effect increasing with increase in concentration, 60% acid has little effect on galena and practically no effect on pyrite, chalcopyrite or the silver sulphides: 70% acid slowly sulphates the galena but does not attack the pyrite or chalcopyrite: with increase in acid concentration the sulphating action on galena increases and the amount of lead sulphate dissolved in the acid increases, but the effect upon pyrite and chalcopyrite increases very little with increase in acid concentration and is relatively very slow even with 95% acid: with acids up to 70% the sulphur combined with the zinc and lead which is sulphated is driven off as $H_2S$ according to the following chemical equations:

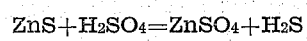
$$ZnS + H_2SO_4 = ZnSO_4 + H_2S$$

With 70% acid a small amount of sulphur is formed by reaction between the $H_2S$ and the sulphuric acid and this effect increases with acid concentration until with 95% acid the sulphur is substantially all separated from the zinc as S according to the following equation:

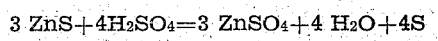
$$3 ZnS + 4H_2SO_4 = 3 ZnSO_4 + 4 H_2O + 4S$$

The sulphur thus formed reacts with the hot very concentrated acids to form $SO_2$ as indicated below:

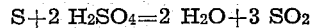
$$S + 2 H_2SO_4 = 2 H_2O + 3 SO_2$$

thus using up acid. To avoid loss of acid and to recover the sulphur as $H_2S$ it is therefore preferable to use acids containing between 60% and 70% $H_2SO_4$. As noted in my U. S. Patent 1,434,084 in order to secure complete sulphating of the zinc with acids of such concentration by merely mixing the comminuted ore with the hot acid it is necessary to use a relatively large excess of acid so preferably sufficient to dissolve the zinc sulphate formed. Tests run with only a small excess of acid gave very poor sulphating, only from 20 to 50% of the zinc in crude ores being sulphated depending upon the time of treatment and excess of acid used. The reason for the low efficiency of the process with only a small excess of acid was due to the low solubility of the $ZnSO_4$ in the acid, the zinc sulphate formed coating the zinc sulphide particles and preventing further action of the acid upon the sulphide.

As described and claimed in my copending patent applications 523,575 filed Mar. 18, 1931; 564,696 filed Sept. 23, 1931; and 565,153 filed Sept. 25, 1931, the use of a sufficient excess of acid to secure complete sulphating of the zinc sulphide in these ores by merely mixing the comminuted ore with the hot acid militated against the commercial use of the process though as described in my U. S. Patent 1,434,088 a substantially complete extraction of zinc from complex ores could be secured by this method.

As noted in my copending patent applications 523,575 and 564,696, I have found that the zinc sulphide in these ores may be substantially completely sulphated by means of a relatively small excess hot sulphuric acid by grinding the comminuted ore with the acid during the sulphating operation. The grinding or attrition during this treatment removes the protecting coating of zinc sulphate which forms on the ZnS particles, due to the very limited solubility of the $ZnSO_4$ in the acid, and allows the reaction between the acid and the zinc sulphide to go to completion, the zinc sulphate being thus produced in solid form mixed with the residual ore and excess acid. Only a small excess of the hot acid is required for this sulphating operation but it is preferable to use a sufficient excess to secure a fluid pulp in the grinding and sulphating operation. This excess may be filtered away from the sulphated ore and used over again in the treatment of more ore or may be neutralized as later described if a minimum excess of acid is used. For this sulphating operation acids between 60% and 70% $H_2SO_4$ are preferred for the reasons noted above.

As described in my copending patent applications above mentioned, I have found that though hot 60% $H_2SO_4$ appears to have practically no effect upon galena (PbS) in these ores and that even with 70% acid the sulphating effect is very slight, yet when the said treatment of said ore with hot $H_2SO_4$, of about 60 to 70% strength, is carried out while subjecting the ore to a grinding operation (as in an acid-proof ball mill), these acids do actually act on the PbS to form $PbSO_4$ and $H_2S$ as indicated in the following equation:

$$PbS + H_2SO_4 = PbSO_4 + H_2S,$$

but due to the fact that the $PbSO_4$ thus formed is practically insoluble in acids of these concentrations, the galena particles when treated with the hot acid are instantly covered with a resistant protecting coating of this insoluble compound which prevents any further action of acid on the particles. This coating and protective action is much more pronounced and effective with galena than with zinc blende only a very small part of the lead being sulphated, so small in fact with 60% acid as to be negligible and yet sufficient to prevent efficient flotation of the galena in ores treated by the methods of my U. S. Patents 1,434,084, and 1,434,088. As covered in my copending patent applications 523,576 and 565,861 I have found that by grinding the ore during treatment with hot acid that the galena may be completely sulphated, the grinding or attrition removing the $PbSO_4$ coating from the galena particles and allowing the reaction to go practically to completion. For this purpose acids above 60% and below 70% are preferable, 65% acid giving excellent results on most ores. Acids of higher concentration may be used but their use results in the loss of acid and $H_2S$ as noted above. In the case of both the blende and galena the action is most efficient and rapid near the boiling point of the acid.

I have thus found that by grinding the comminuted complex zinc sulphide ores with hot acids of the concentration mentioned that both the zinc and lead in these complex ores may be completely sulphated and left in the ore mixture as solid sulphates, that the sulphur originally combined with the lead and zinc is driven off as $H_2S$ in this treatment and that sulphides such as pyrite, chalcopyrite and silver sulphides (and complex silver sulphide minerals) may be substantially unaffected by this treatment. The time of treatment required for sulphating varies from 15 to 45 minutes according to the fineness of grinding and character of the ore.

This sulphating treatment makes possible the substantially complete separation of the lead and zinc and residual sulphides by the following steps, the zinc sulphate being leached out of the sulphated mixture with water, leaving the insoluble lead sulphate with the residual ore, the lead sulphate being thereafter leached out of the residual mixture with brine (preferably a hot sodium chloride brine containing $CaCl_2$) leaving the residual sulphides and gold and silver mixed with gangue from which they may readily be separated by flotation.

Figure 2:
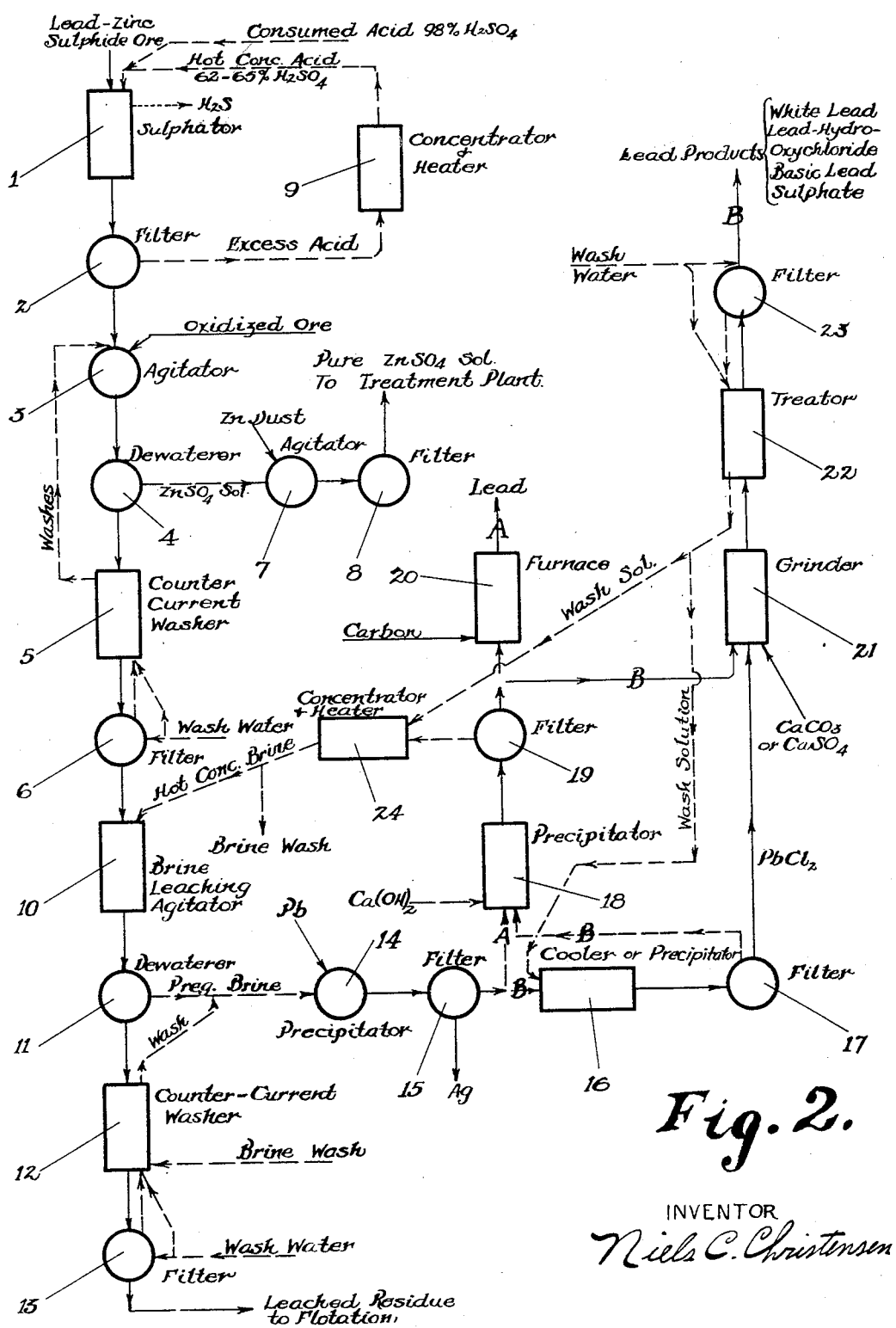

The method of carrying out the complete process in practical application is illustrated in the flow sheet shown in Fig. 2. The accompanying drawings, Fig. 1, consist of curves showing the solubility of zinc sulphate in hot and in cold acids of different concentration from which the amount of $ZnSO_4$ in solution in different parts of the sulphating and zinc leaching steps of the process may be ascertained.

In practical operation the process is preferably carried out by the methods and apparatus described in the following more complete description:

The comminuted ore or concentrate is ground together with the excess of hot acid in the sulphator (1) for approximately 30 minutes. The circulating or excess acid here used is preferably from 62–65% $H_2SO_4$. The acid consumed in the sulphating operation may be added as 98% acid but should be mixed with the excess acid before coming into contact with the ore in order to avoid loss of acid and $H_2S$ as noted above. The sulphator (1) consists preferably of an acid-proof silex (or porcelain) lined pebble mill using small flint pebbles or porcelain marbles, as the grinding or attrition medium, and provided with glands at the inlet and outlet ends of the mill to prevent loss of $H_2S$ and contamination of this gas with air. From the sulphator (1) the sulphated ore and excess acid goes to the acid proof filter (2) where the excess acid is filtered out and passed through the concentrator and heater (9) and is returned to the process for reuse. If a minimum of acid is used the filter (2) may be omitted in some cases but in the treatment of most ores it is preferable to use a considerable excess of acid in order to secure a fluid pulp for grinding in the sulphator (1). The filter cake containing the solid $ZnSO_4$ and $PbSO_4$ and residual ore is now mixed with washes from the counter-current washer (5) in the agitator (3) and the zinc brought into solution. The acid in the solution is then neutralized with oxidized lead zinc ore and the iron and manganese are precipitated by means of a suitable oxidizing agent. This neutral zinc sulphate solution thus formed is then separated from the lead sulphate and ore residue in the dewaterer (4) and counter-current washer (5), and filter (6) and sent to the agitator (7) for treatment with zinc dust to remove cadmium (or traces of other metals) in solution and this precipitate is then separated from the pure zinc sulphate solution in the filter (8). If desired the zinc sulphate and residual acid may be washed out of the sulphated ore mixture with water and thereafter this acid solution after being separated from the ore may be neutralized with oxidized lead-zinc ore and the iron and manganese be precipitated therefrom. This method involves an additional precipitating and filtering operation as compared with the first method. The first method therefor preferred unless it is desired to keep the ore residues separate. The pure zinc sulphate solution thus formed may be evaporated to recover solid $ZnSO_4$ or the solution may be treated for the recovery of the zinc by electrolysis as described in my copending patent application or may be treated for the recovery of zinc therefrom as the basic carbonate or oxide or sulphide or as described in my copending patent applications.

The mixture of lead sulphate, residual sulphides and insoluble gangue from the filter (6) goes to the brine leaching agitator (10) in which the lead sulphate is dissolved in hot concentrated sodium chloride brine containing $CaCl_2$, lead being brought into solution as $PbCl_2$ and the sulphate precipitated as $CaSO_4$ as indicated below:

$$PbSO_4 + CaCl_2 = PbCl_2 + CaSO_4$$

This leaching operation may be carried out with a substantially neutral brine unless it is desired to dissolve as much silver as possible at this point in which a slightly acid brine is used. If acid brine is used the acid must be neutralized with oxidized ore and iron and manganese must be precipitated by means of a suitable oxidizing such as lead peroxide at the end of the leaching operation. The clean pregnant solution formed in the leaching operation is separated from the residual ore and precipitated $CaSO_4$ and filter (13). To prevent precipitation of $PbCl_2$ in the final wash with water, the ore residue from the dewaterer (11) is first washed with hot barren brine to remove most of the lead chloride and thereafter with water to remove the brine.

The residual sulphides (and Au and Ag), gangue and precipitated $CaSO_4$ from the filter (13) are now sent to flotation to separate the residual sulphides and valuable metals from the $CaSO_4$ and gangue. The previous leaching treatment has prepared these sulphides in such a manner that they float with great ease making this operation very rapid and complete.

The hot pregnant solution from the dewaterer (11) is treated with Pb (or PbS or other suitable precipitant) for the precipitation of silver and the precipitate and excess precipitant is filtered out of the solution in the filter (15). If a neutral solution is used this step may be omitted or used merely as a precautionary measure. The lead is precipitated from the pure pregnant lead brine thus obtained in such a way as to recover the chlorine combined therewith as $CaCl_2$ in the barren brine. This may be done by either of the methods indicated in the flow sheet by the lines A—A or B—B—B. If the lead is to be recovered as metal the method shown in A—A is used, the pregnant brine from the dewaterer (11) or filter (15) is agitated with $Ca(OH)_2$ in the precipitator (18) to precipitate the lead as a lead hydroxide product. This precipitate is filtered out of the brine in the filter (19) and can be smelted in the furnace (20) with carbon to reduce the precipitate to metallic lead. Any uncombined $Ca(OH)_2$ and Cl in the precipitate combined in this smelting operation to form $CaCl_2$ which together with any salt NaCl in the precipitate forms a slag which is dissolved in the barren brine for reuse. The barren brine from the filter (19) is passed through the heater and concentrator (24) and heated and reused in the process.

If the lead is to be recovered as a paint pigment the method indicated in flow line B—B—B is used. In this case the pregnant solution from the dewaterer (11) or filter (15) passes through the cooler or precipitator (16) in which the desired proportion of the lead is precipitated as $PbCl_2$. This precipitation may be brought about either by cooling the solution, or by diluting the hot solution with wash solutions from the treater (22) or by a combination of these. The $PbCl_2$ thus precipitated is filtered out of the solution in the filter (17) and the partially precipitated solution is treated with $Ca(OH)_2$ in the precipitator (18) to precipitate the residual lead a lead hydroxide precipitate (mixed with some unused $Ca(OH)_2$ and lead hydroxy chloride). This precipitate is filtered out of the solution in filter (19) and the solution is concentrated and heated in the concentrator and heater (24) and reused in the process. The lead chloride from the filter (17) and the lead hydroxide precipitate from the filter (19) are used for the production of pigments by grinding in the proper proportion alone or mixed with either $CaCO_3$ or $CaSO_4$ in proper proportion, in the grinder (21) and then treated with water in counter current in the treator (22) to first wash out the $CaCl_2$ formed in the grinder and thereafter to complete the reaction to form lead hydroxy chloride, or basic lead carbonate or sulphate. By varying the proportion of lead hydroxide precipitate to $PbCl_2$, or $PbCl_2$ and chemical equivalent of $CaSO_4$ or $CaCO_3$, white lead pigments of any desired degree of basicity may be secured. If an excess of $PbCl_2$ is precipitated in the precipitator (16) its equivalent of Ca(OH) or lime may be added in the grinder (21). The basic pigments $Pb(OH)Cl$, $2 PbCO_3 \cdot Pb(OH)_2$ or $PbSO_4 \cdot Pb(OH)_2$ made in this way are excellent white pigments having a high tinting strength and covering power. The $CaCl_2$ formed by the precipitation with lime remains in the brine and the $CaCl_2$ formed by treating the $PbCl_2$ with $CaCO_3$ or $CaSO_4$ is recovered in the water solution from the treator which is returned to the brine solution in the precipitator (16) or the concentrator (24), thus insuring a supply of $CaCl_2$ to precipitate the sulphion with the lead as calcium sulphate as described above. If the lead is recovered as the hydroxy chloride $CaCl_2$ from an external source must be supplied to make up for the chlorine lost in this compound. The process of making these pigments is claimed and is described in detail in my copending patent applications 568,511, 568,512 and 568,513, and hence are but briefly described in the foregoing.

Having described my process what I claim and desire to patent is:

1. In the treatment of sulphide ores containing both lead and zinc, concentrates of such ores and the like, with sulphuric acid to convert the zinc and lead therein into solid sulphates, the herein described process which consists in grinding the said ore material in admixture with hot sulphuric acid, of about 60 to 70% concentration, such sulphuric acid being present in an amount which is substantially in excess over that stoichiometrically equivalent to zinc and lead in the ore material under treatment, but which is only a minor fraction of that amount which would be necessary to dissolve all of the zinc sulphate produced from the zinc sulphide, and thereby converting the zinc and lead in the ore directly into sulphates, without thereby dissolving any substantial proportion of the zinc sulphate produced in said reaction, the main bulk of the zinc sulphate present at any one time being in the solid state.

2. In the treatment of complex sulphide ores containing both lead and zinc sulphides, concentrates of such ores and the like, with sulphuric acid, to convert the lead and zinc therein into sulphates, the process which comprises grinding the said ore material in admixture with hot sulphuric acid in the range of concentrations in which the solubility of zinc sulphate in the hot acid is near the minimum, such sulphuric acid being present in an amount sufficient to sulphate all of the lead and zinc in the ore material, but being only a minor fraction of that amount which would be necessary to dissolve all of the zinc sulphate produced from the zinc sulphide in the ore material, and thereby converting both the lead and zinc in the said ore material directly into lead and zinc sulphates, both in solid form, without, at any time in the sulphation process, dissolving any large proportion of the zinc sulphate in the sulphating acid.

3. Process of claim 2, followed by the steps of first dissolving the zinc sulphate out of the sulphated mixture, in an aqueous liquid having no substantial action upon lead sulphate, and thereafter dissolving the lead sulphate out of the residue, in a hot chloride brine containing some calcium chloride.

4. In the treatment of complex sulphide ores containing both lead and zinc sulphides, concentrates of such ores and the like, with sulphuric acid, to convert the lead and zinc therein into sulphates, the process which comprises grinding the said ore material in admixture with hot sulphuric acid in the range of concentrations in which the solubility of zinc sulphate in the hot acid is near the minimum, such sulphuric acid being present in an amount sufficient to sulphate all of the lead and zinc in the ore material, but being only a minor fraction of that amount which would be necessary to dissolve all of the zinc sulphate produced from the zinc sulphide in the ore material, and thereby converting both the lead and zinc in the said ore material directly into lead and zinc sulphates, both in solid form, without, at any time in the sulphation process, dissolving any large proportion of the zinc sulphate in the sulphating acid and thereafter filtering a large part of the excess acid used from the mixture of solid sulphates and ore residue, and adding said separated acid while hot, to more of the said ore material in the sulphation process.

5. In the treatment of complex sulphide ores containing both lead and zinc sulphides, concentrates of such ores and the like, with sulphuric acid, to convert the lead and zinc therein into sulphates, the process which comprises grinding the said ore material in admixture with hot sulphuric acid in the range of concentrations in which the solubility of zinc sulphate in the hot acid is near the minimum, such sulphuric acid being present in an amount sufficient to sulphate all of the lead and zinc in the ore material, but being only a minor fraction of that amount which would be necessary to dissolve all of the zinc sulphate produced from the zinc sulphide in the ore material, and thereby converting both the lead and zinc in the said ore material directly into lead and zinc sulphates, both in solid form, without, at any time in the sulphation process, dissolving any large proportion of the zinc sulphate in the sulphating acid and adding a more highly concentrated sulphuric acid to the mixture of ore material and acid, during the said sulphation process, to maintain the acid in contact with the ore, at the degree of concentration stated.

6. In the treatment of sulphide ores containing both lead and zinc, concentrates of such ores and the like, with sulphuric acid to convert the zinc and lead therein into solid sulphate, the herein described process which consists in grinding the said ore material in admixture with hot sulphuric acid, of about 60 to 70% concentration, such sulphuric acid being present in an amount which is substantially in excess over that stoichiometrically equivalent to zinc and lead in the ore material under treatment, which is only a minor fraction of that amount which would be necessary to dissolve all of the zinc sulphate produced from the zinc sulphide, and thereby converting the zinc and lead in the ore directly into sulphates, without thereby dissolving any substantial proportion of the zinc sulphate produced in said reaction, the main bulk of the zinc sulphate present at any one time being in the solid state and adding a more highly concentrated sulphuric acid to the mixture of ore material and acid, during the said sulphation process, to maintain the acid in contact with the ore, at the degree of concentration stated.

7. In the treatment of sulphide ores containing both lead and zinc, concentrates of such ores and the like, with sulphuric acid to convert the zinc and lead therein into solid sulphates, the herein described process which consists in grinding the said ore material in admixture with hot sulphuric acid, of about 62 to 65% concentration, such sulphuric acid being present in an amount which is substantially in excess over that stoichiometrically equivalent to zinc and lead in the ore material under treatment, but which is only a minor fraction of that amount which would be necessary to dissolve all of the zinc sulphate produced from the zinc sulphide, and thereby converting the zinc and lead in the ore directly into sulphates, without thereby dissolving any substantial proportion of the zinc sulphate produced in said reaction, the main bulk of the zinc sulphate present at any one time being in the solid state.

NIELS C. CHRISTENSEN.